United States Patent
Kovie et al.

(10) Patent No.: US 12,552,460 B2
(45) Date of Patent: Feb. 17, 2026

(54) VEHICLE BODY STRUCTURE

(71) Applicant: NISSAN NORTH AMERICA, INC., Franklin, TN (US)

(72) Inventors: David Kovie, Livonia, MI (US); Christopher J Herrala, Milford, MI (US); Derrick Diver, White Lake, MI (US); Dion Richter, Ferndale, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 406 days.

(21) Appl. No.: 17/561,442

(22) Filed: Dec. 23, 2021

(65) Prior Publication Data

US 2023/0202569 A1    Jun. 29, 2023

(51) Int. Cl.
| | | |
|---|---|---|
| *B62D 25/02* | (2006.01) | |
| *B60J 5/04* | (2006.01) | |
| *E05B 81/70* | (2014.01) | |
| *G01S 13/931* | (2020.01) | |

(52) U.S. Cl.
CPC ............ *B62D 25/02* (2013.01); *B60J 5/0415* (2013.01); *E05B 81/70* (2013.01); *G01S 13/931* (2013.01); *G01S 2013/93274* (2020.01)

(58) Field of Classification Search
CPC ......... B62D 25/02; E05B 81/70; E05B 81/76; G01S 13/931; G01S 2013/93274; G01S 2013/9327; G01S 7/027; G01S 7/028
See application file for complete search history.

(56) References Cited

U.S. PATENT DOCUMENTS

| | | | | |
|---|---|---|---|---|
| 8,113,695 | B2 * | 2/2012 | Meinke | B60R 13/00 |
| | | | | 362/351 |
| 9,804,261 | B2 * | 10/2017 | Dechoux | G01S 13/931 |
| 9,964,641 | B2 * | 5/2018 | Watanabe | G01S 7/02 |
| 10,195,926 | B2 * | 2/2019 | Sugie | G01S 7/02 |
| 10,435,920 | B2 * | 10/2019 | Ganeshan | B60Q 9/008 |
| 10,857,952 | B2 * | 12/2020 | Nakayama | G01S 13/931 |
| 11,292,396 | B2 * | 4/2022 | Hwang | B60R 19/483 |
| 11,473,353 | B2 * | 10/2022 | Miyashiro | B60J 5/00 |
| 11,866,983 | B2 * | 1/2024 | Schatz | G01S 13/34 |
| 2014/0111950 | A1 * | 4/2014 | Yamasaki | B60R 16/0239 |
| | | | | 361/747 |
| 2015/0123850 | A1 * | 5/2015 | Goraya | G01S 13/931 |
| | | | | 342/385 |
| 2019/0101634 | A1 * | 4/2019 | Baheti | G01S 7/415 |
| 2020/0157873 | A1 * | 5/2020 | Sabatini | E05B 81/76 |
| 2020/0298777 | A1 * | 9/2020 | Lund | B60R 19/483 |
| 2021/0262274 | A1 | 8/2021 | Schatz et al. | |

(Continued)

FOREIGN PATENT DOCUMENTS

| | | | | |
|---|---|---|---|---|
| DE | 102013009671 A1 * | 12/2014 | ............ | B60R 13/04 |
| DE | 102019112698 A1 * | 1/2020 | ............ | G01S 13/931 |
| JP | 2020091259 A * | 6/2020 | ............ | B60R 11/02 |

(Continued)

*Primary Examiner* — Steve Clemmons
(74) *Attorney, Agent, or Firm* — Spencer Fane, LLP (57) ABSTRACT

A vehicle body structure includes a vehicle outer panel, a trim member, a mounting bracket and a radar device. The vehicle outer panel has an outboard surface. The trim member is installed to the outboard surface of the vehicle outer panel. The mounting bracket is installed to an inboard side of the trim member. The radar device is installed to the mounting bracket.

20 Claims, 8 Drawing Sheets

(56) References Cited

U.S. PATENT DOCUMENTS

2022/0291332 A1\* 9/2022 Kim ........................ G01S 7/027
2023/0160250 A1\* 5/2023 Goodchild .............. E05F 15/40
                                                  49/28

FOREIGN PATENT DOCUMENTS

| WO | WO-2015045849 A1 \* | 5/2015 | ............. G01S 13/42 |
| WO | WO-2015072289 A1 \* | 5/2015 | ........... B60R 19/483 |
| WO | WO-2016098486 A1 \* | 6/2016 | ............. B60R 11/02 |

\* cited by examiner

VEHICLE BODY STRUCTURE

BACKGROUND

Technical Field

The present disclosure generally relates to a vehicle body structure. More specifically, the present disclosure relates to a vehicle body structure having side exterior trim panel with a radar device mounted and concealed thereon.

Background Information

Vehicles currently have radar devices installed to the vehicle such that movement of vehicles forward of the vehicle can be monitored.

SUMMARY

One object of the present disclosure is to provide a vehicle with a side trim panel that includes a fully concealed and securely mounted radar device thereto.

In view of the state of the known technology, one aspect of the present disclosure is to provide a vehicle body structure with a vehicle outer panel, a trim member, a mounting bracket and a radar device. The vehicle outer panel has an outboard surface. The trim member is installed to the outboard surface of the vehicle outer panel. The mounting bracket is installed to an inboard side of the trim member. The radar device is installed to the mounting bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
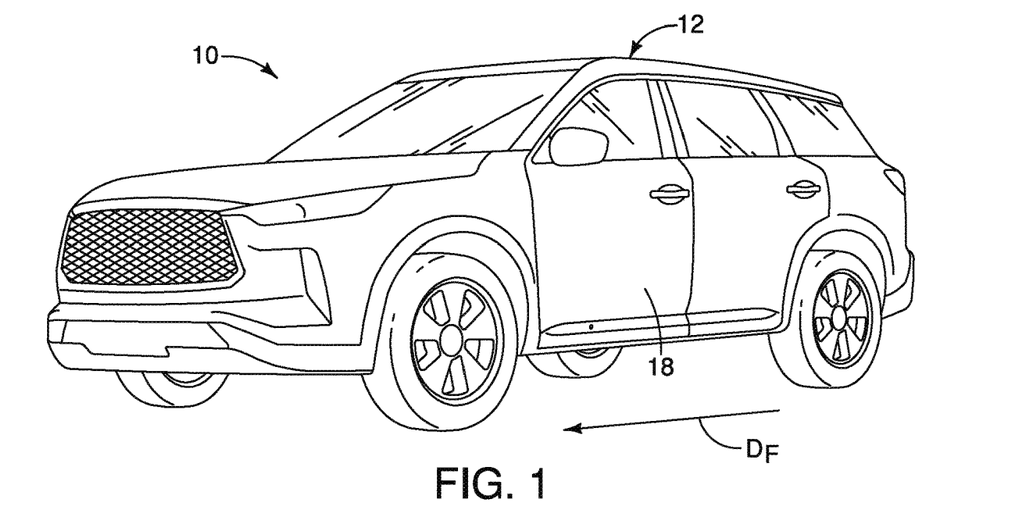
FIG. 1 is a perspective view of a vehicle that includes a side vehicle door assembly that includes a trim panel with a radar device concealed therein.

Referring initially to FIG. 1, a vehicle 10 having a vehicle body structure 12 with a door lock system 14 and a radar device 16 is illustrated in accordance with a first embodiment.

Figure 2:
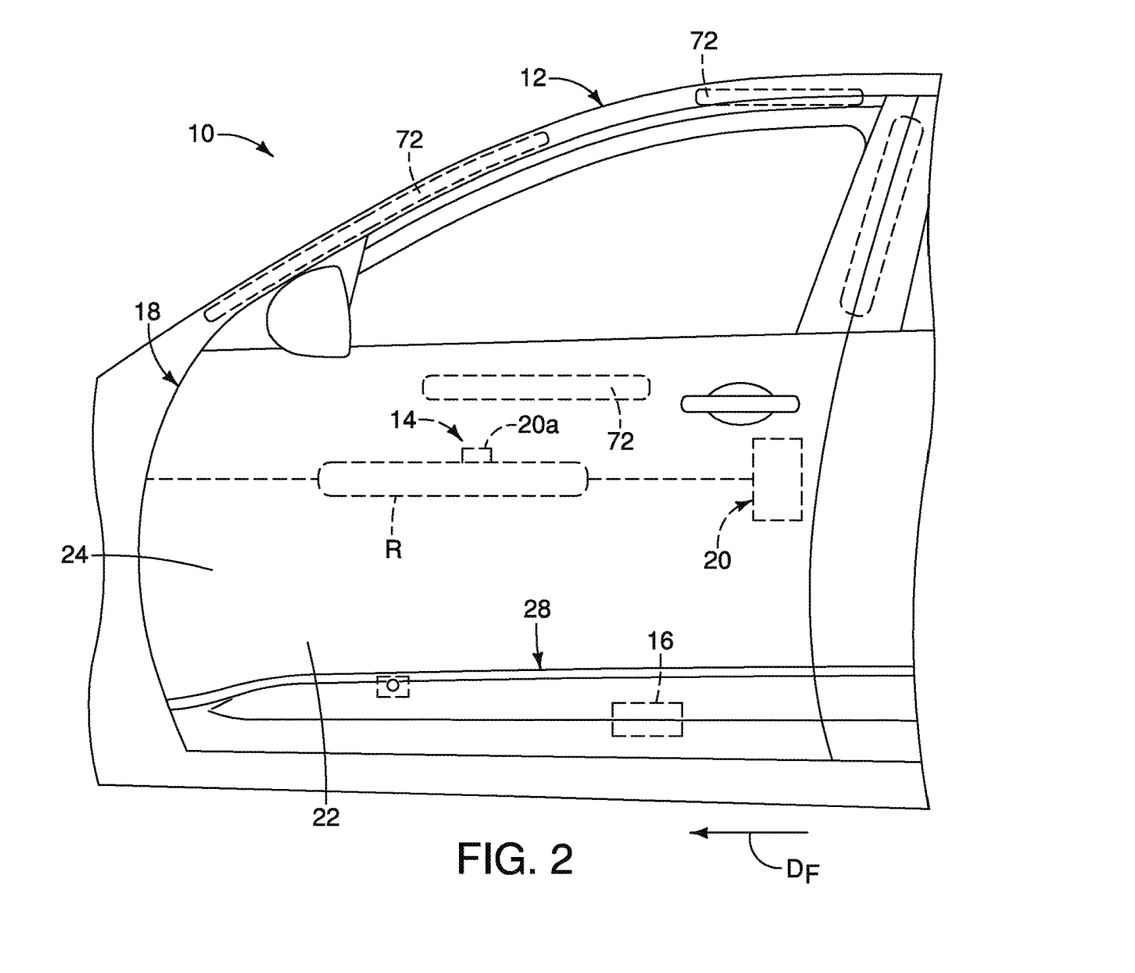
FIG. 2 is a side view of the side door showing the trim panel, the radar device and portions of a door lock system in accordance with an exemplary embodiment.
Figure 3:
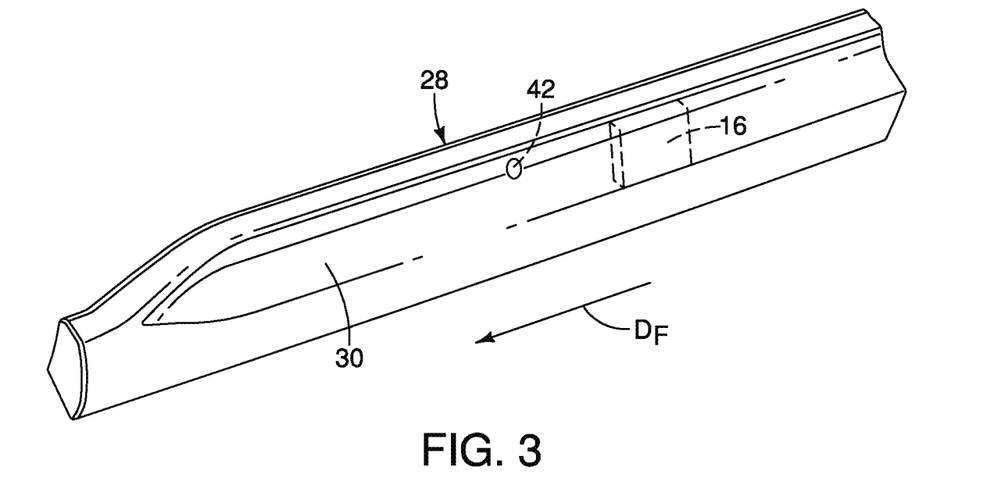
FIG. 3 is a first perspective view of an outboard surface of the trim panel removed from the vehicle door assembly in accordance with the exemplary embodiment.
Figure 4:
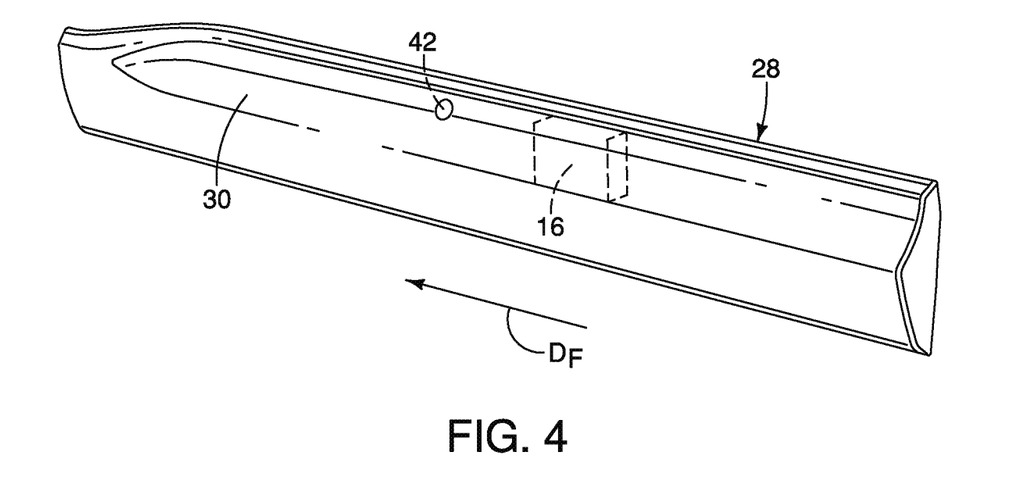
FIG. 4 is a second perspective view of the outboard surface of the trim panel removed from the vehicle door assembly in accordance with the exemplary embodiment.
Figure 5:
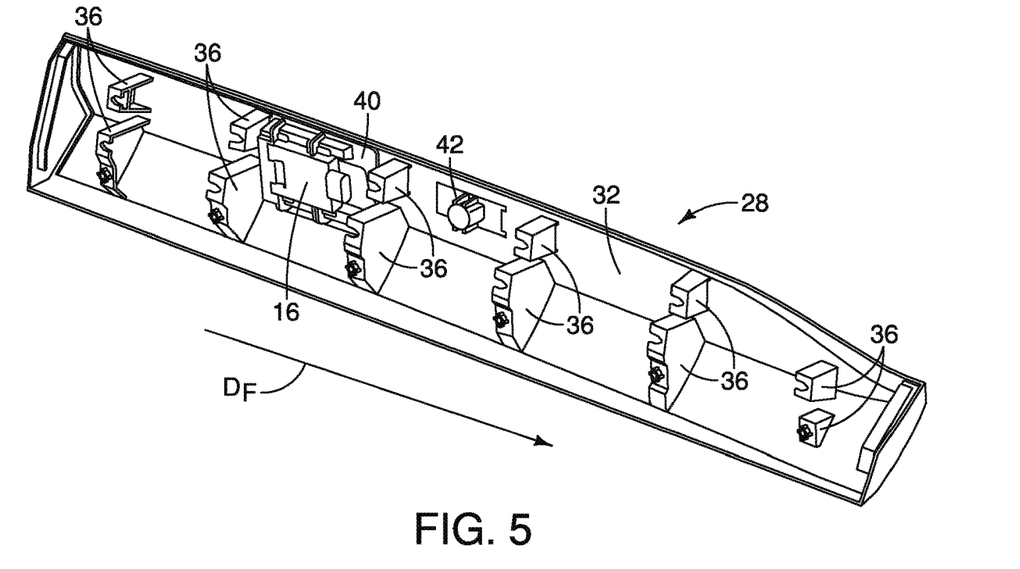
FIG. 5 is a first perspective view of an inboard surface of the trim panel showing attachment projections, a mounting bracket and the radar device installed to the mounting bracket in accordance with the exemplary embodiment.
Figure 6:
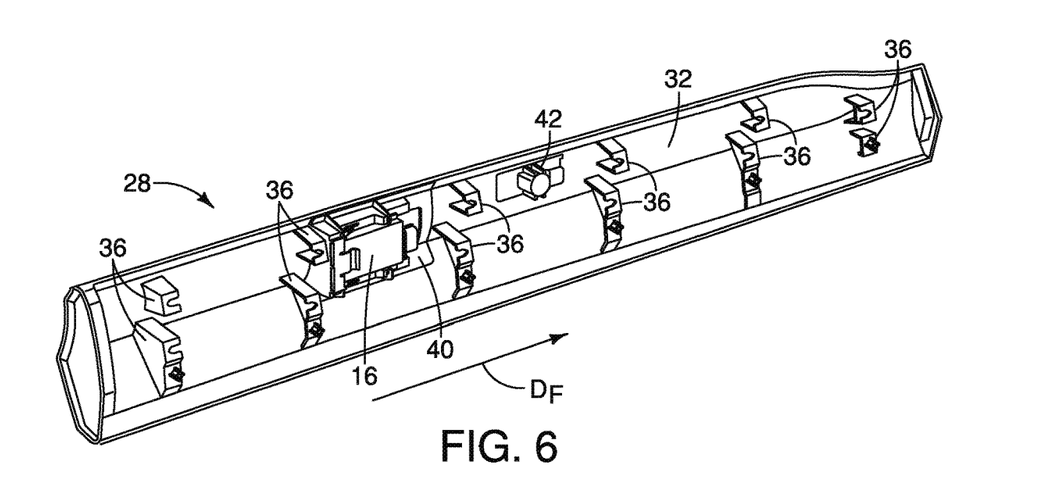
FIG. 6 is a second perspective view of the inboard surface of the trim panel showing attachment projections, the mounting bracket and the radar device installed to the mounting bracket in accordance with the exemplary embodiment.
Figure 7:
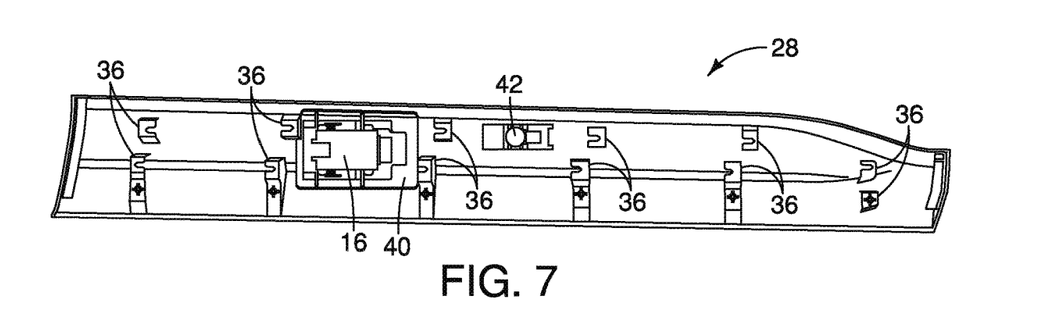
FIG. 7 is a side view of the inboard surface of the trim panel showing attachment projections, the mounting bracket and the radar device installed to the mounting bracket in accordance with the exemplary embodiment.

The vehicle body structure 12 includes a plurality of vehicle door assemblies 18 (hereinafter the door assemblies 18). Each door assembly 18 is pivotally attached to the vehicle body structure 12 for movement between a closed position (shown in FIGS. 1 and 2) and an open position (not shown).

Each door assembly includes a door lock 20 of the door lock system 14 and an outer door panel 22 (also referred to as a vehicle outer panel 22). The door lock 20 is installed within a cavity within the door assembly 18 inboard of the outer door panel 22. The outer door panel 22 has an outboard surface 24. An inner trim panel (not shown) of the outer door panel 22 includes an armrest R. A manually operated lock switch 20a can be installed to the armrest R.

In the depicted embodiment, there are four door assemblies 18. All four of the door assemblies 18 include one of the door locks 20 and one of the lock switches 20a. It should be understood from the drawings and the description herein that all four of the door assemblies 18 of the vehicle 10 can include one of the radar devices 16. However, in the depicted embodiment, only the front pair (driver's side and passenger's side front doors) of the door assemblies 18 include one of the radar devices 16. Therefore, for the sake of brevity, only one of the front door assemblies 18 is described hereinbelow but applies equally to both front door assemblies 18.

It should be understood from the drawings and the description herein that the lock switch 20*a* can be installed to other locations within the vehicle 10, such as on a center console (not shown). Since door assemblies, lock switches and armrests are conventional vehicle components, further description is omitted for the sake of brevity.

A trim member 28 is installed to a lower area of the outboard surface 24 of the outer door panel 22. The trim member 28, as shown in FIGS. 3-10, includes an outboard surface 30 and an inboard surface 32. The inboard surface 32 includes a plurality of attachment projections 36, a mounting bracket 40 and an optional sonar unit 42. Alternatively, the trim member 28 can be installed along a higher area of the outer door panel 22. For example, the trim member 28 could be installed to the outer door panel 22 at a height that is the same or slightly lower than the level of the armrest R. The shape, contours and dimensions of the trim member 28 can vary vehicle-to-vehicle and are decorative such that these shapes, contours and dimensions conform to an overall design of the vehicle 10.

The plurality of attachment projections 36 are basically doghouse structures that are fitted with snap-fitting projections (not shown) that are insert into small openings in the lower area of the outboard surface 24 of the outer door panel 22 in a conventional manner thereby attaching the trim member 28 to the outer door panel 22. Since doghouse structures and snap-fitting projections are conventional vehicle trim attachment components well known in the art, further description is omitted for the sake of brevity.

As shown in FIGS. 5-15, the mounting bracket 40 is fixedly attached to the inboard surface 32 of the trim member 28. The mounting bracket 40 is dimensioned and configured to retain the radar device 16 such that the radar device 16 is rigidly and non-movably retained on the trim member 28.

The mounting bracket 40 includes base portions 48, a plurality of inboard facing surface portions 50, a pair of biased locking members 52, a tab member 54 and a plurality of retaining projections 56. The base portions 48, the plurality of inboard facing surface portions 50, the pair of biased locking members 52, the tab member 54 and the plurality of retaining projections 56 are all made as a single, monolithic, unitary element, such as a metal material. Alternatively, the mounting bracket 40 can be molded from a plastic or polymer material. However, in the depicted embodiment, the mounting bracket 40 is a single piece of metal shaped to include the base portions 48, the plurality of inboard facing surface portions 50, the pair of biased locking members 52, the tab member 54 and the plurality of retaining projections 56. Preferably, the trim member 28 is made of a resin-based, plastic and/or polymer materials and the mounting bracket 40 is made of metal.

As shown in FIGS. 5-15, the base portions 48 overlay corresponding portions of the inboard surface 32 of the trim member 28 and are fixedly attached thereto. More specifically, the base portions 48 are fixed to the inboard surface 32 via plastic welding, adhesive or can be molded into the trim member 28 during the manufacturing process of the trim member 28.

Figure 14:
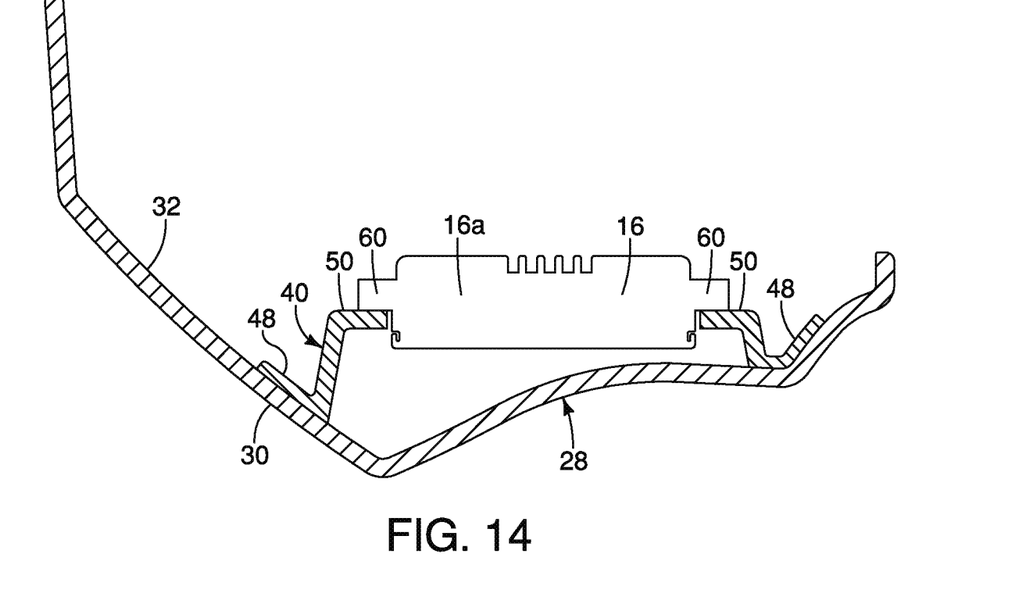
FIG. 14 is a cross-sectional view of the trim panel, the mounting bracket and the radar device taken along the line 14-14 in FIG. 10 in accordance with the exemplary embodiment.
Figure 15:
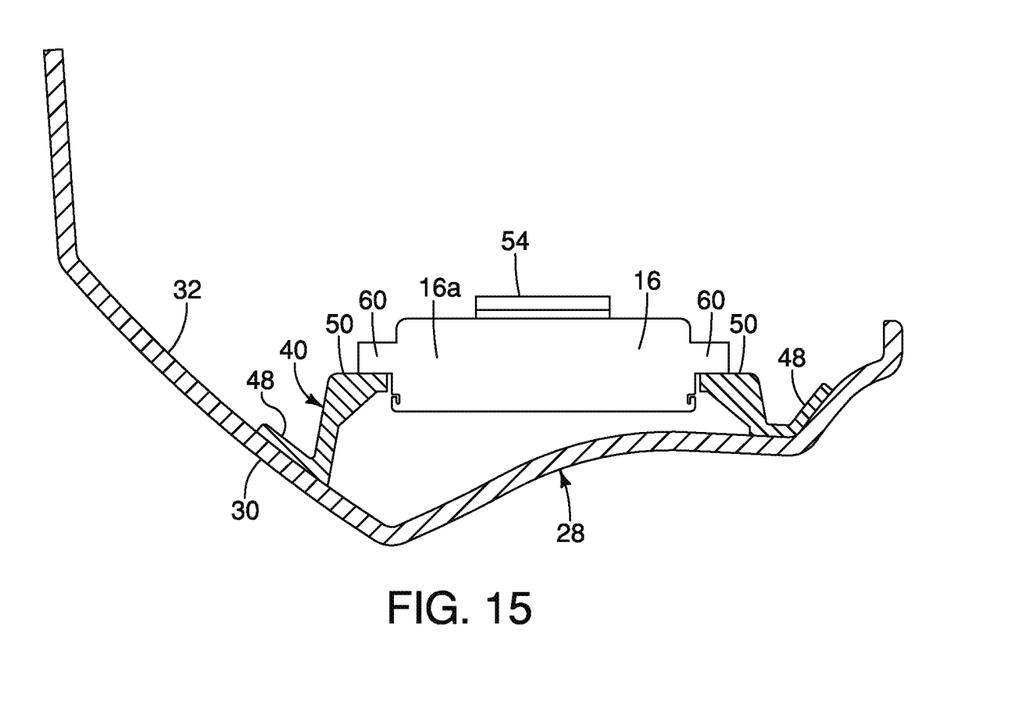
FIG. 15 is a cross-sectional view of the trim panel, the mounting bracket and the radar device taken along the line 15-15 in FIG. 10 in accordance with the exemplary embodiment.

The plurality of inboard facing surface portions 50 are spaced apart from the base portions 48 and from one another. The inboard facing surface portions 50 are all basically co-planar. As shown in FIGS. 14 and 15, the base portions 48 are not parallel to the inboard facing surface portions 50. Rather, the base portions 48 are angularly offset from the inboard facing surface portions 50.

Figure 8:
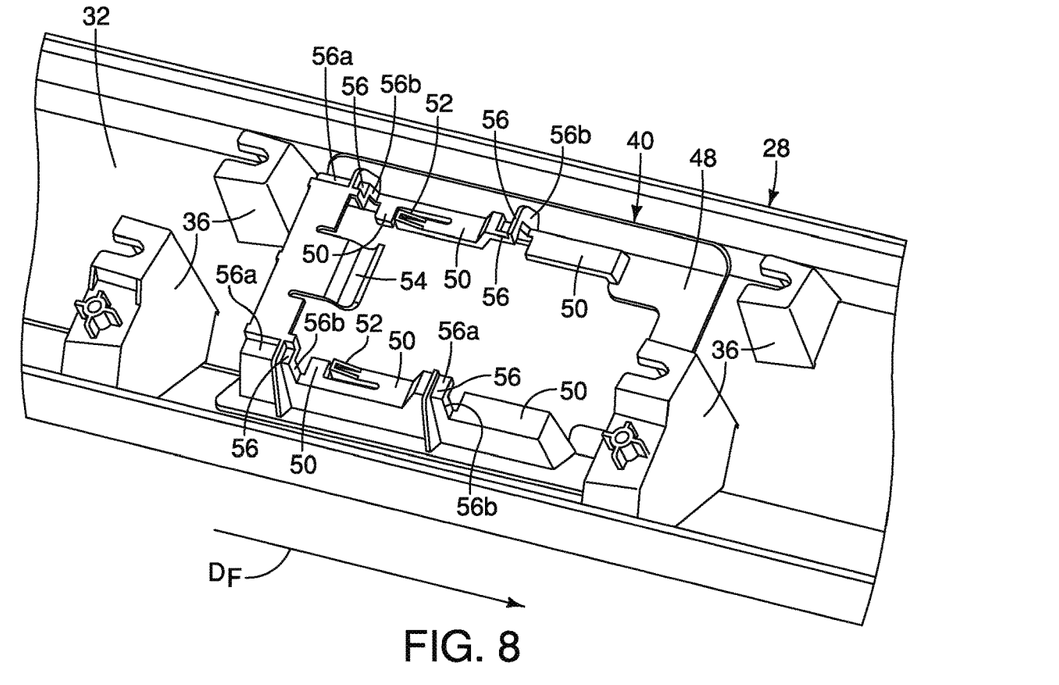
FIG. 8 is a perspective view of a portion of the inboard surface of the trim panel showing further details of the attachment projections and the mounting bracket with the radar device removed in accordance with the exemplary embodiment.
Figure 9:
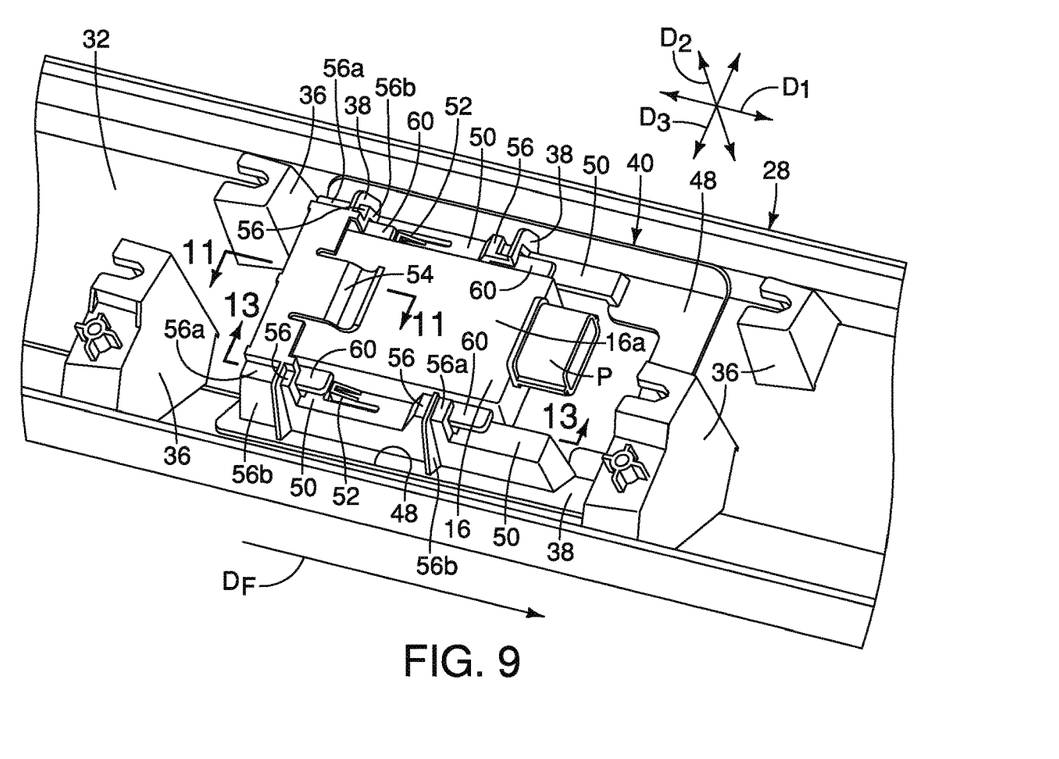
FIG. 9 is another perspective view of a portion of the inboard surface of the trim panel similar to FIG. 8 showing the radar device installed to the mounting bracket in accordance with the exemplary embodiment.
Figure 12:
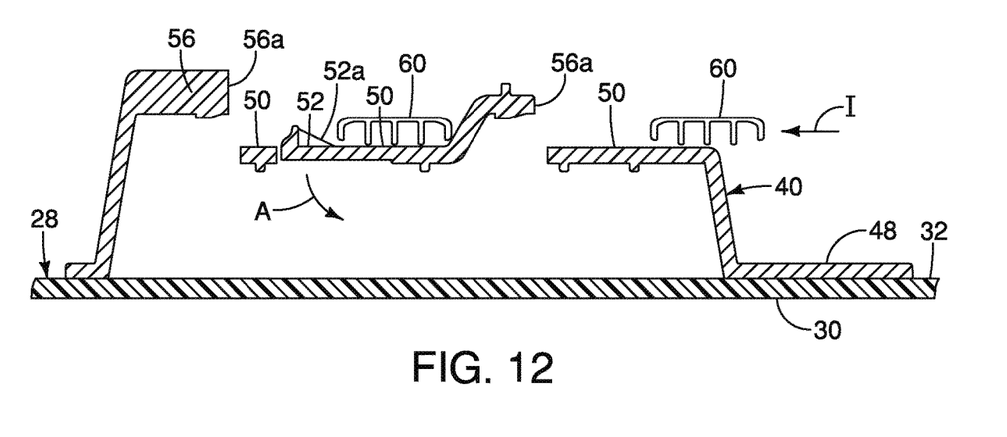
FIG. 12 is a cross-sectional view of the trim panel, the mounting bracket and the radar device taken along the line 13-13 in FIG. 9 showing the radar device in the process of being installed to the bracket in accordance with the exemplary embodiment.

The pair of biased locking members 52 are defined on opposite sides of the mounting bracket 40 between adjacent ones of the plurality of inboard facing surface portions 50, as shown in FIGS. 8-9 and 12. The locking members 52 are shaped and configured such that distal ends thereof can be pushed below adjacent ones of the inboard facing surface portions 50 and have sufficient resiliency to return to their original orientation shown in the drawings. The tab member 54 extends between the biased locking members 52. The majority of the tab member 54 extends in a direction parallel to the plurality of inboard facing surface portions 50.

Figure 10:
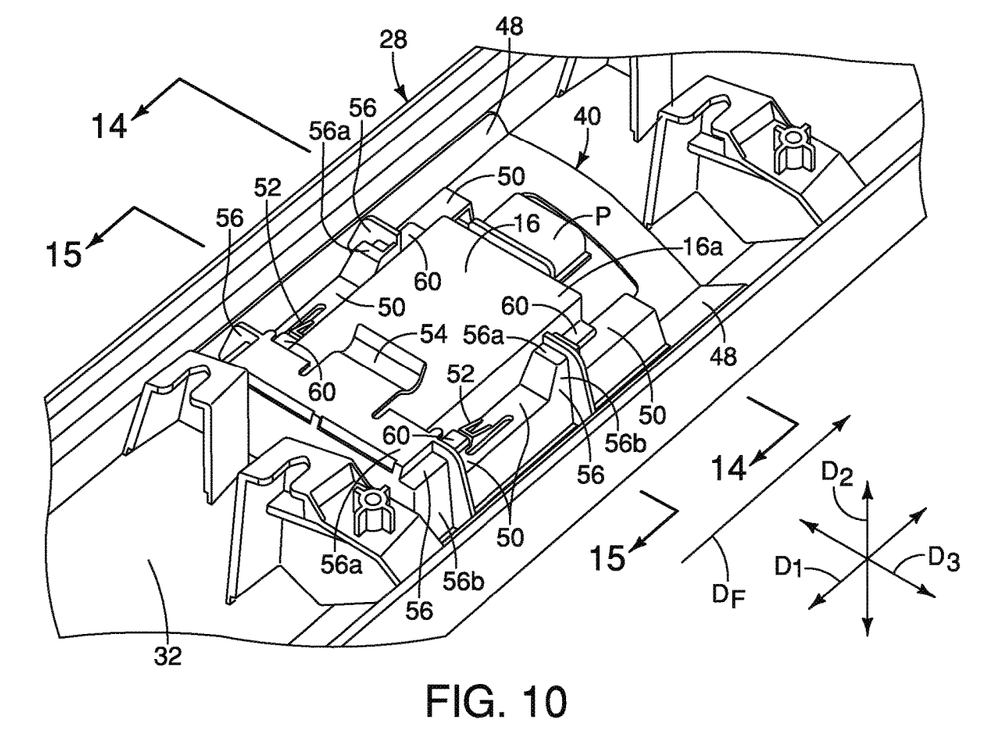
FIG. 10 is another perspective view of a portion of the inboard surface of the trim panel showing the radar device installed to the mounting bracket in accordance with the exemplary embodiment.
Figure 11:
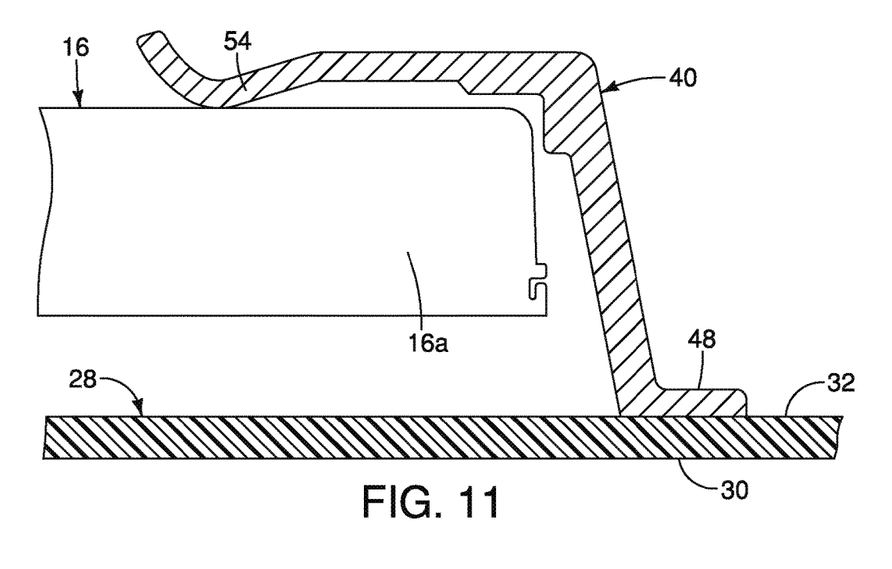
FIG. 11 is a cross-sectional view of the trim panel, the mounting bracket and the radar device taken along the line 11-11 in FIG. 9 in accordance with the exemplary embodiment.
Figure 13:
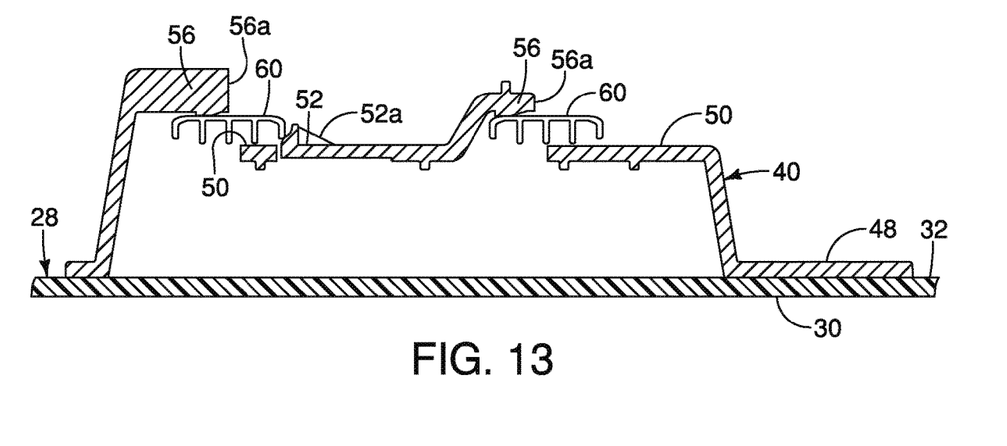
FIG. 13 is another cross-sectional view of the trim panel, the mounting bracket and the radar device taken along the line 13-13 in FIG. 9 showing the radar device fully installed to the bracket in accordance with the exemplary embodiment.

There are four of the retaining projections 56 spaced apart from one another with a predetermined spacing. As shown in FIGS. 8-10, 12 and 13, each retaining projection 56 includes an inboard portion 56*a*. As shown in FIGS. 8-10, each retaining projection 56 includes lateral portions 56*b*. The lateral portions 56*b* extend from the inboard portions 56*a* to adjacent one or ones of the inboard facing surface portions 50. The inboard portion 56*a* of each retaining projection 56 is spaced apart from an adjacent one of the inboard facing surface portions 50, as shown in FIGS. 12 and 13.

As shown in FIGS. 9-10 and 14-15, the radar device 16 includes a main body 16*a* with plurality of attachment sections 60 that extend laterally from the four corners of the main body of the radar device 16. There are four attachment sections 60 spaced apart from one another with a predetermined spacing such that the four attachment sections 60 contact corresponding inboard facing surface portion 50 and are retained by the retaining projections 56 and the tab member 54. The main body 16*a* also includes a connector socket or plug P for electrical connection to an electronic controller 70 that is described further hereinbelow.

As shown in FIGS. 12 and 13, each of the attachment sections 60 has an overall height that is approximately equal to the spacing between the spacing between the inboard portion 56*a* of the retaining projection 56 the inboard facing surface portions 50. As is shown by comparing FIGS. 12 and 13, during installation, the attachment sections 60 of the radar device 16 are placed on corresponding ones of the inboard facing surface portions 50 (FIG. 12). An installation force I is applied to the radar device 16 causing the attachment sections 60 to move toward the left in FIG. 12. The leading pair of attachment sections 60 are pressed against a ramp portions 52*a* of the locking members 52 causing the locking members 52 to deflect, as indicated by the arrow A in FIG. 12.

Once the attachment sections 60 have moved fully to the left, as shown in FIG. 13, leading ends of the attachment sections 60 are confined between the inboard portions 56*a* of the retaining projections 56 and the adjacent inboard facing surface portion 50. Further, the attachment sections 60 are preventing from moving away from the retaining projections by the locking members 52 that have sprung back up to their original orientations. Further, as shown in FIGS. 9-11 and 15, the tab member 54 presses against the main body 16*a* of the radar device 16 securing the radar device 16 to the mounting bracket 40 and the trim member 28. The lateral portions 56*b* of each of the retaining projections 56 prevents lateral movement of the radar device 16 further securing the radar device 16 to the mounting bracket 40.

Hence, the biased locking members 52 are dimensioned and shaped such that with the radar device 16 installed to the mounting bracket 40, the biased locking members 52 and the inboard portions 56a of the retaining projections 56 prevent movement of the radar device 16 relative to the mounting bracket 40 along a first direction D1, as shown in FIGS. 9 and 10. Further, the tab member 54 is dimensioned and shaped such that with the radar device 16 installed to the mounting bracket 40 the tab member 54 and the inboard facing surface portions 50 prevent movement of the radar device 16 relative to the mounting bracket 40 along a second direction D2 perpendicular to the first direction D1.

The lateral portions 56b of the retaining projection 56 are dimensioned and shaped such that with the radar device 16 installed to the mounting bracket 16 the lateral portions 56b plurality of retaining projections 56 prevent movement of the radar device 16 relative to the mounting bracket 40 along a third direction Ds perpendicular to the first and second directions D1 and D2.

Figure 16:
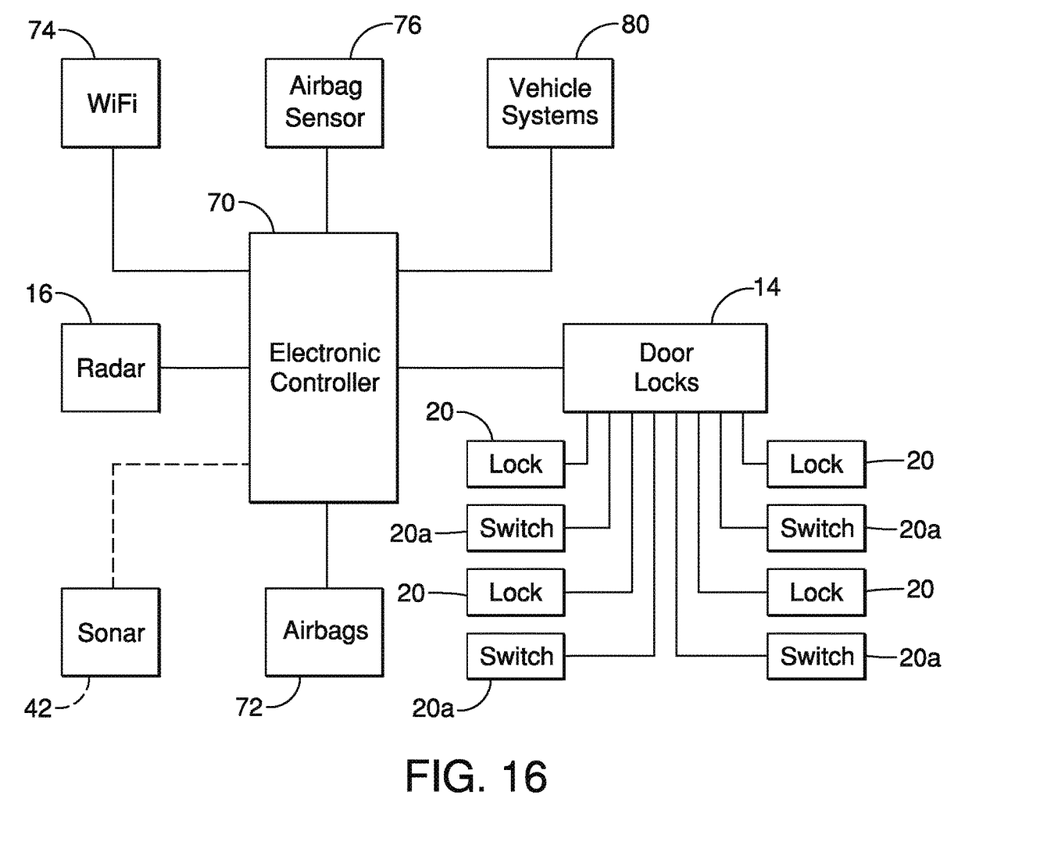
FIG. 16 is a block diagram showing an electronic controller connected to the radar device and a door lock system in accordance with the exemplary embodiment.

As shown in FIG. 16, the electronic controller 70 is connected to the door lock system 14, the radar device 16, airbags 72, wireless communication (WiFi) 74, airbag sensors 76, various other vehicle systems 80 and the optional sonar unit 42. The electronic controller 70 is configured such that in response to the radar device 16 detecting movement of an object, such as another vehicle, toward the outer door panel 22, the electronic controller 70 locks all of the locks 20 of the door lock system 14 preventing the vehicle door assembly or assemblies 18 from opening. The electronic controller 70 can further be configured to coordinate with signals from the airbag sensors 76 to deploy airbags 72, if determined to be necessary.

The optional sonar unit 42 is not required but can be included on the vehicle 10 for parking assistance and other various functions.

The electronic controller 70 preferably includes a microcomputer with a door lock system and optionally an airbag system control program that controls the door lock system in response to predetermined data detected by the radar device 16. The electronic controller 70 can also include other conventional components such as an input interface circuit, an output interface circuit, and storage devices such as a ROM (Read Only Memory) device and a RAM (Random Access Memory) device. The microcomputer of the electronic controller 70 is programmed to control the door lock system 14. The memory circuit stores processing results and control programs such as ones for door lock operation that are run by the processor circuit.

The various vehicle features (other than the trim member 28, the mounting bracket 40, the radar device 16 and electronic controller 70) are conventional components that are well known in the art. Since such vehicle features are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

The invention claimed is:

1. A vehicle body structure, comprising:
a vehicle side door assembly having a vehicle outer panel having defining an outboard surface, the vehicle side door assembly being pivotally attached to a vehicle for movement between a closed position and an open position;
a trim member installed to the outboard surface of the vehicle outer panel, the outboard surface of the outer door panel facing in a direction transverse to a forward direction of the vehicle, an outboard surface of trim member being an externally exposed surface;
a mounting bracket fixedly attached directly to an inner surface of the trim member;
a radar device installed to the mounting bracket such that the radar device is adjacent to the outboard surface of the vehicle outer panel, and capable of detecting an object in the direction transverse to the forward direction of the vehicle and movement of the object toward the outboard surface of the vehicle side door;
an airbag system including airbags; and an electronic controller connected to the radar device and the airbag system such that in response to the radar device detecting the movement of the object toward the outer door panel, the electronic controller sends a signal to deploy the airbags, the mounting bracket being configured such that a gap is disposed between an inner surface of the trim member and an outer surface of the radar device without structural elements of the trim member being disposed in the gap.

2. The vehicle body structure according to claim 1, wherein the mounting bracket includes a biased locking member dimensioned and shaped such that with the radar device installed to the mounting bracket the biased locking member prevents movement of the radar device relative to the mounting bracket along a first direction.

3. The vehicle body structure according to claim 2, wherein the mounting bracket includes tab member dimensioned and shaped such that with the radar device installed to the mounting bracket the tab member prevents movement of the radar device relative to the mounting bracket along a second direction perpendicular to the first direction.

4. The vehicle body structure according to claim 3, wherein the mounting bracket includes a plurality of retaining projections dimensioned and shaped such that with the radar device installed to the mounting bracket the plurality of retaining projections prevent movement of the radar device relative to the mounting bracket along a third direction perpendicular to the first and second directions.

5. The vehicle body structure according to claim 1, wherein the trim member is installed to a lower area of the outboard surface of the outer door panel.

6. The vehicle body structure according to claim 1, further comprising a door lock system; and an electronic controller connected to the radar device and the door lock system such that in response to the radar device detecting the movement of the object toward the vehicle outer panel, the electronic controller locks the door lock system preventing connected vehicle doors from opening.

7. The vehicle body structure according to claim 1, wherein the gap is, and a second gap is disposed between an outer surface of the vehicle side door and the inner surface of the radar device.

8. The vehicle body structure according to claim 1, wherein the trim member is disposed on a lower half of the vehicle side door and extends a full length of the vehicle side door, such that the radar device is disposed below a handle of the vehicle side door.

9. A vehicle body structure, comprising:

a vehicle side door assembly having a vehicle door assembly with an outer door panel defining an outboard surface, the vehicle door assembly being pivotally attached to a vehicle for movement between a closed position and an open position;

a trim member installed to the outboard surface of the outer door panel, the outboard surface of the outer door panel facing in a direction transverse to a forward direction of the vehicle, an outboard surface of trim member being an externally exposed surface;

a mounting bracket fixedly attached directly to an inner surface of the trim member;

a radar device installed to the mounting bracket such that the radar device is adjacent to the outboard surface of the vehicle outer panel, and capable of detecting an object in the direction transverse to the forward direction of the vehicle and movement of the object toward the outboard surface;

a door lock system with at least a portion thereof installed within the vehicle door;

an airbag system including airbags; and an electronic controller connected to the radar device and the door lock system such that in response to the radar device detecting the movement of the object toward the outer door panel, the electronic controller locks the door lock system preventing the vehicle door from opening, and sends a signal to deploy the airbags, the mounting bracket being configured such that a gap is disposed between an inner surface of the trim member and an outer surface of the radar device without structural elements of the trim member being disposed in the gap.

10. The vehicle body structure according to claim 9, wherein the mounting bracket includes a base portion with a biased locking member dimensioned and shaped such that with the radar device installed to the mounting bracket the biased locking member prevents movement of the radar device relative to the mounting bracket along a first direction.

11. The vehicle body structure according to claim 10, wherein the mounting bracket includes tab member dimensioned and shaped such that with the radar device installed to the mounting bracket the tab member prevents movement of the radar device relative to the mounting bracket along a second direction perpendicular to the first direction.

12. The vehicle body structure according to claim 11, wherein the mounting bracket includes a plurality of retaining projections dimensioned and shaped such that with the radar device installed to the mounting bracket the plurality of retaining projections prevent movement of the radar device relative to the mounting bracket along a third direction perpendicular to the first and second directions.

13. The vehicle body structure according to claim 9, wherein the trim member is installed to a lower area of the outboard surface of the outer door panel.

14. A vehicle body structure, comprising:

a vehicle door assembly having an outer door panel with an outboard surface, the vehicle side door assembly being pivotally attached to a vehicle for movement between a closed position and an open position;

a trim member installed to the outboard surface of the vehicle outer panel, the outboard surface of the vehicle outer panel facing in a direction transverse to a forward direction of the vehicle, an outboard surface of trim member being an externally exposed surface;

a mounting bracket fixedly attached directly to an inner surface of the trim member, the mounting bracket having a plurality of inboard facing surface portions;

a radar device installed to the mounting bracket such that the radar device is held against the inboard facing surface portions and such that the radar device is adjacent to the outboard surface of the vehicle outer panel, and capable of detecting an object in the direction transverse to the forward direction of the vehicle and movement of the object toward the outboard surface; an airbag system including airbags; and an electronic controller connected to the radar device and the airbag system such that in response to the radar device detecting the movement of the object toward the outer door panel, the electronic controller sends a signal to deploy the airbags, the mounting bracket being configured such that a gap is disposed between an inner surface of the trim member and an outer surface of the radar device without structural elements of the trim member being disposed in the gap.

15. The vehicle body structure according to claim 14, wherein
the radar device has a main body with a plurality of attachment sections that extend from lateral sides of the main body, the plurality of attachment sections contacting corresponding ones of the plurality inboard facing surface portions.

16. The vehicle body structure according to claim 15, wherein
the mounting bracket includes a biased locking member dimensioned and shaped such that with the radar device installed to the mounting bracket the biased locking member prevents movement of the radar device relative to the mounting bracket along a first direction parallel to the plurality inboard facing surface portions.

17. The vehicle body structure according to claim 16, wherein
the mounting bracket includes tab member dimensioned and shaped such that with the radar device installed to the mounting bracket the tab member presses against the main body of the radar unit urging the plurality of attachment sections against the corresponding ones of the plurality inboard facing surface portions in a second direction perpendicular to the first direction.

18. The vehicle body structure according to claim 17, wherein
the mounting bracket includes a plurality of retaining projections dimensioned and shaped such that with the radar device installed to the mounting bracket the plurality of retaining projections prevent movement of the radar device relative to the mounting bracket along a third direction perpendicular to the first and second directions.

19. The vehicle body structure according to claim 14, wherein
the trim member is installed to a lower area of the outboard surface of the outer door panel.

20. The vehicle body structure according to claim 14, further comprising
a door lock system at least partially installed within the vehicle door assembly; and
an electronic controller connected to the radar device and the door lock system such that in response to the radar device detecting the movement of the object toward the outer door panel, the electronic controller locks the door lock system preventing the vehicle door assembly from opening.

* * * * *